(12) United States Patent
Heidemann (10) Patent No.: US 11,644,303 B2
(45) Date of Patent: May 9, 2023

(54) THREE-DIMENSIONAL COORDINATE MEASURING INSTRUMENT COUPLED TO A CAMERA HAVING A DIFFRACTIVE OPTICAL ELEMENT

(71) Applicant: FARO Technologies, Inc., Lake Mary, FL (US)

(72) Inventor: Rolf Heidemann, Stuttgart (DE)

(73) Assignee: FARO Technologies, Inc., Lake Mary, FL (US)

( * ) Notice: Subject to any disclaimer, the term of this patent is extended or adjusted under 35 U.S.C. 154(b) by 347 days.

(21) Appl. No.: 17/025,553

(22) Filed: Sep. 18, 2020

(65) Prior Publication Data

US 2021/0180940 A1 Jun. 17, 2021

Related U.S. Application Data

(60) Provisional application No. 62/948,590, filed on Dec. 16, 2019.

(51) Int. Cl.
*G01B 11/00* (2006.01)
*H04N 5/225* (2006.01)
*G06T 7/70* (2017.01)

(52) U.S. Cl.
CPC ............. *G01B 11/005* (2013.01); *G06T 7/70* (2017.01); *H04N 5/2253* (2013.01); *H04N 5/2254* (2013.01); *G06T 2207/30204* (2013.01); *G06T 2207/30244* (2013.01)

(58) Field of Classification Search
CPC .............. G01B 11/005; G01B 11/2518; G01B 2210/52; G06T 7/70; G06T 2207/30204; G06T 2207/30244; G06T 7/337; G06T 7/521; H04N 5/2253; H04N 5/2254; H04N 5/2257
USPC ........................................................ 382/103
See application file for complete search history.

(56) References Cited

U.S. PATENT DOCUMENTS

| | | | |
|---|---|---|---|
| 8,995,057 B2 | 3/2015 | Miyasaka et al. | |
| 9,074,861 B2 | 7/2015 | Tamiya | |
| 9,477,018 B2 | 10/2016 | Miyasaka et al. | |
| 10,754,036 B2 | 8/2020 | Pei et al. | |
| 2009/0091834 A1 | 4/2009 | Ryzi et al. | |
| 2017/0067734 A1* | 3/2017 | Heidemann | G01C 15/00 |
| 2017/0094251 A1 | 3/2017 | Wolke et al. | |
| 2020/0267377 A1 | 8/2020 | Romano et al. | |

* cited by examiner

*Primary Examiner* — Stephen P Coleman
(74) *Attorney, Agent, or Firm* — McCarter & English, LLP; Dave S. Christensen (57) ABSTRACT

A method including determining with a three-dimensional (3D) measuring instrument 3D coordinates of an object for each of a plurality of poses of the 3D measuring instrument; capturing with a camera first- and higher-order diffraction components of markers near or on the object, the camera having a diffractive optical element (DOE), a lens, and a photosensitive array; and registering with a processor the determined 3D coordinates based at least in part on the determined 3D coordinates and on the imaged zero- and higher-order diffraction components.

7 Claims, 14 Drawing Sheets

THREE-DIMENSIONAL COORDINATE MEASURING INSTRUMENT COUPLED TO A CAMERA HAVING A DIFFRACTIVE OPTICAL ELEMENT

CROSS REFERENCE TO RELATED APPLICATIONS

This application claims the benefit of U.S. Provisional Application Ser. No. 62/948,590, filed Dec. 16, 2019, the entire disclosure of which is incorporated herein by reference.

BACKGROUND

The present disclosure relates to a camera and particularly a camera used with a coordinate measuring device.

One category of coordinate measuring device uses cameras to assist in registration carried out as a part of a measurement procedure. Another type of coordinate measuring device uses a camera as a component of the coordinate measuring device.

A difficulty often faced in making coordinate measurements is in obtaining accurate registration information when moving the coordinate measuring device from a first position and orientation (i.e., a first pose) to a second pose. Such registration information is needed to combine measurements made in the first pose with measurements made in the second pose. Cameras are sometimes used to assist in obtaining such registration information, but cameras with wide fields-of-view (FOVs) have relatively low resolution, and cameras with high resolution have relative narrow FOVs.

Another limitation sometimes faced by coordinate measuring devices that include a camera is that the camera's limited FOV may limit the region that can be measured by the device.

Although coordinate measuring devices that make use of cameras are generally suitable for their intended purpose, the limited FOV of the cameras can limit speed and accuracy of the devices. What is needed is a system and method having the features described herein.

SUMMARY

According to an embodiment of the present invention, a method includes: providing a three-dimensional (3D) measuring instrument and a registration camera coupled to the 3D measuring instrument, the registration camera having a diffractive optical element (DOE), and a photosensitive array; with the 3D measuring instrument, determining 3D coordinates of an object at each of a plurality of poses of the 3D measuring instrument; with the camera, capturing for each of the plurality of poses an image having a diffraction component of one or more markers on or around the object; with the processor, registering the determined 3D coordinates based at least in part on the determined 3D coordinates and on the imaged diffraction components of the one or more markers; and storing the registered 3D coordinates.

According to a further embodiment of the present invention, a method includes: providing a line scanner having a projector and a camera, the camera having a diffractive optical element (DOE) and a photosensitive array; with the projector, projecting a line of light onto an object; with the camera, capturing an image of the line of the projected line of light on the object, the image including a diffraction component; with a processor, determining 3D coordinates of points on the projected line of light on the object, the determining based at least in part on diffraction component; and storing the determined 3D coordinates.

According to a further embodiment of the present invention, a method includes providing a two-dimensional (2D) camera with a photosensitive array and a diffractive optical element (DOE); with the camera, capturing for each of the plurality of poses an image having a diffraction component of one or more markers on or around the object; with the processor, determining the real direction of the observed at least one marker based at least in part on the observation of the diffracted image; and storing a measure of the real direction.

These and other advantages and features will become more apparent from the following description taken in conjunction with the drawings.

DETAILED DESCRIPTION OF THE DRAWINGS

Referring now to the drawings, exemplary embodiments are shown which should not be construed to be limiting regarding the entire scope of the disclosure, and wherein the elements are numbered alike in several FIGURES.

DETAILED DESCRIPTION

Some embodiments of the present disclosure provide improved apparatus and methods for registration of coordinate measuring instruments. Other embodiments of the present disclosure provide methods of measuring coordinates over relative wide FOVs while retaining relatively high measuring accuracy.

Figure 1A:
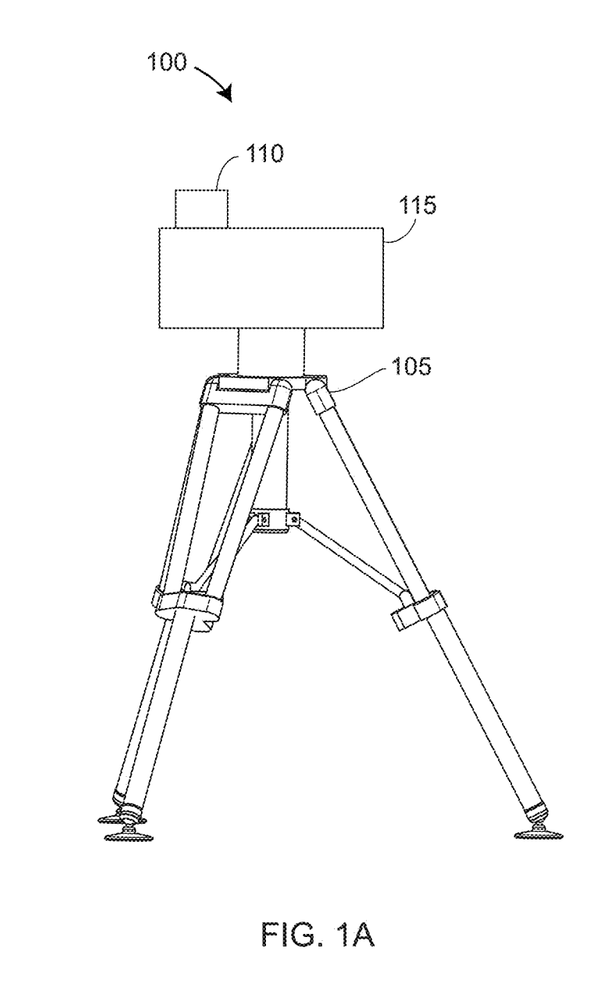
FIG. 1A is an isometric view of a system having a stand, a camera, and a 3D measuring instrument according to an embodiment.
Figure 1B:
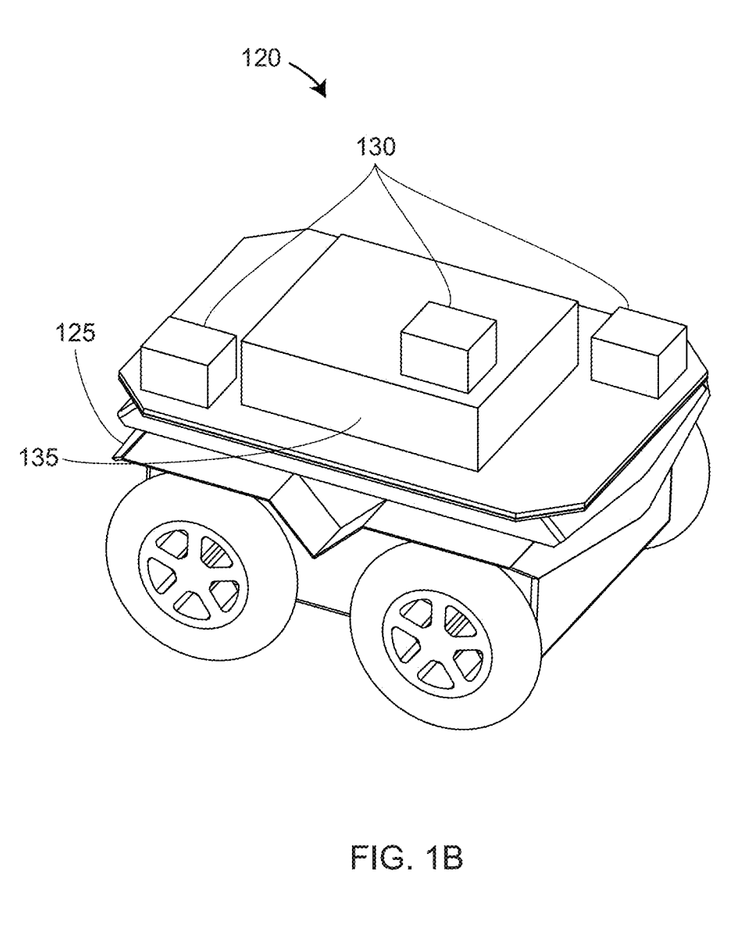
FIG. 1B is an isometric view of a mobile system having a mobile cart, one or more cameras, and a 3D measuring instrument according to an embodiment.

In an embodiment illustrated in FIG. 1A, a system 100 includes a camera 110, a 3D measuring device 115, and a stand 105 such as a tripod or instrument stand. In an embodiment, the camera 110 is fixedly coupled to the 3D measuring device 115 and may be incorporated within the 3D measuring device 115. In an embodiment illustrated in FIG. 1B, a mobile system 120 includes a mobile cart 125 to which is affixed one or more cameras 130. In an embodiment, the one or more cameras are fixedly coupled to a 3D measuring device 135.

Figure 2:
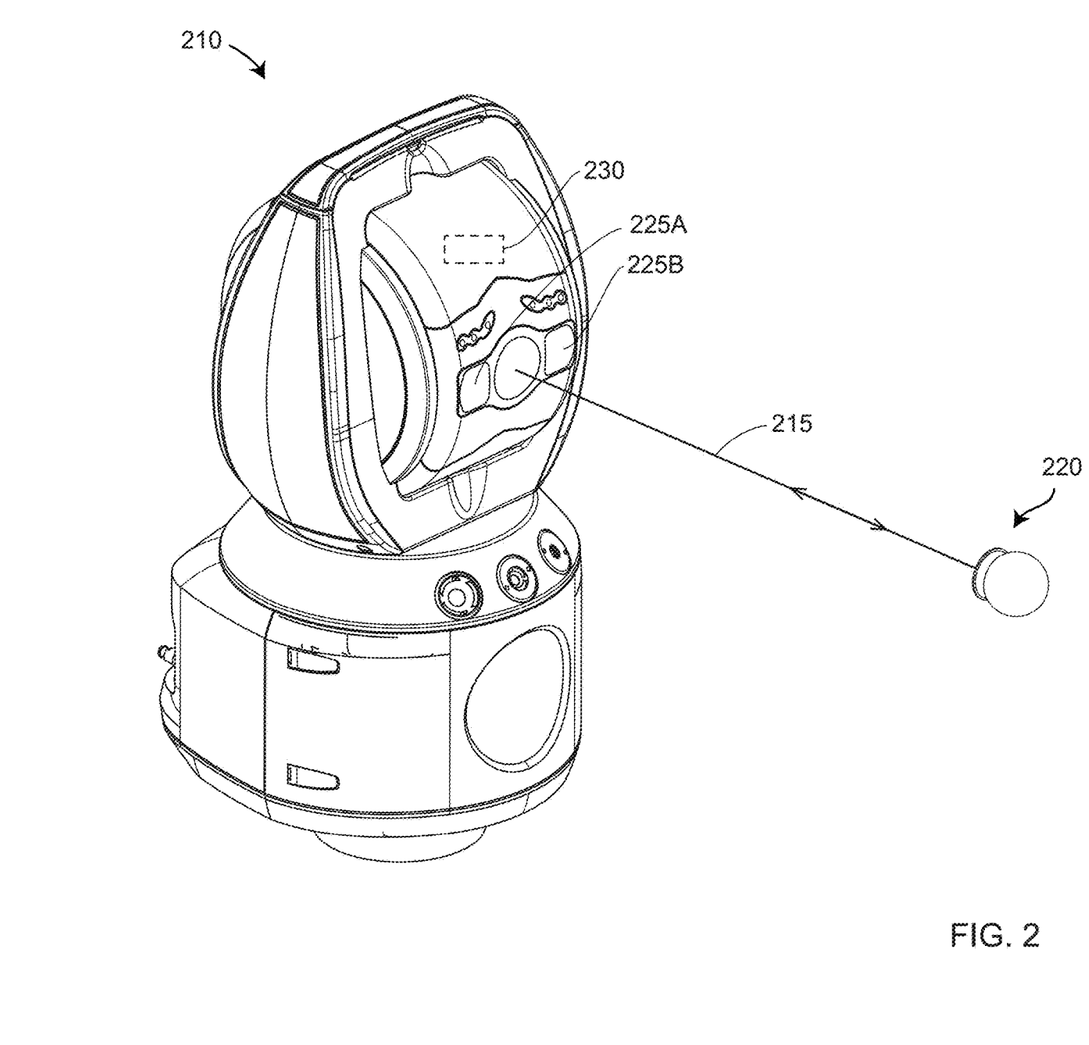
FIG. 2 is an isometric view of a laser tracker according to an embodiment.

In an embodiment illustrated in FIG. 2, the 3D measuring instrument is a laser tracker 210, a type of instrument that emits a beam of light 215. In one mode of operation of the laser tracker 210, the beam of light 215 is locked onto a spherically mounted retroreflector (SMR) 220, which includes a metal sphere into which is embedded a retroreflector. In the most common type of SMR, the retroreflector is a cube corner retroreflector having three mutually perpendicular mirror surfaces that mutually intersect in a vertex point. In a mode of operation, the laser tracker keeps the beam of light centered on the vertex point, thereby enabling the laser tracker to follow the movements of the SMR, measuring a distance and two angles to the SMR from the tracker center of rotation. In an embodiment, the distance is determined with a distance meter and the two angles are determined with angular transducers such as angular encoders. In this way, the laser tracker 210 measures the 3D coordinates of the center of the SMR 220 as the SMR is moved from point to point, for example, measuring the 3D coordinates of points on the surface of an object. A laser tracker may have many cameras. One type of camera is a targeting camera such as the cameras 225A, 225B. In an embodiment, the targeting cameras include light emitting diodes (LEDs) proximate to the cameras 225A, 225B that when illuminated make the SMR 220 visible on the photosensitive arrays of the cameras 225A, 225B. Another type of camera that may be found in a laser tracker is a six-DOF camera 230 used for measuring six degrees-of-freedom (six-DOF). In an embodiment, a multiplicity of light sources such as LEDs on an accessory six-DOF probe are imaged by the six-DOF camera 230, thereby enabling the laser tracker 210 to determine 3D coordinates of a probe tip attached to the six-DOF probe.

Figure 3:
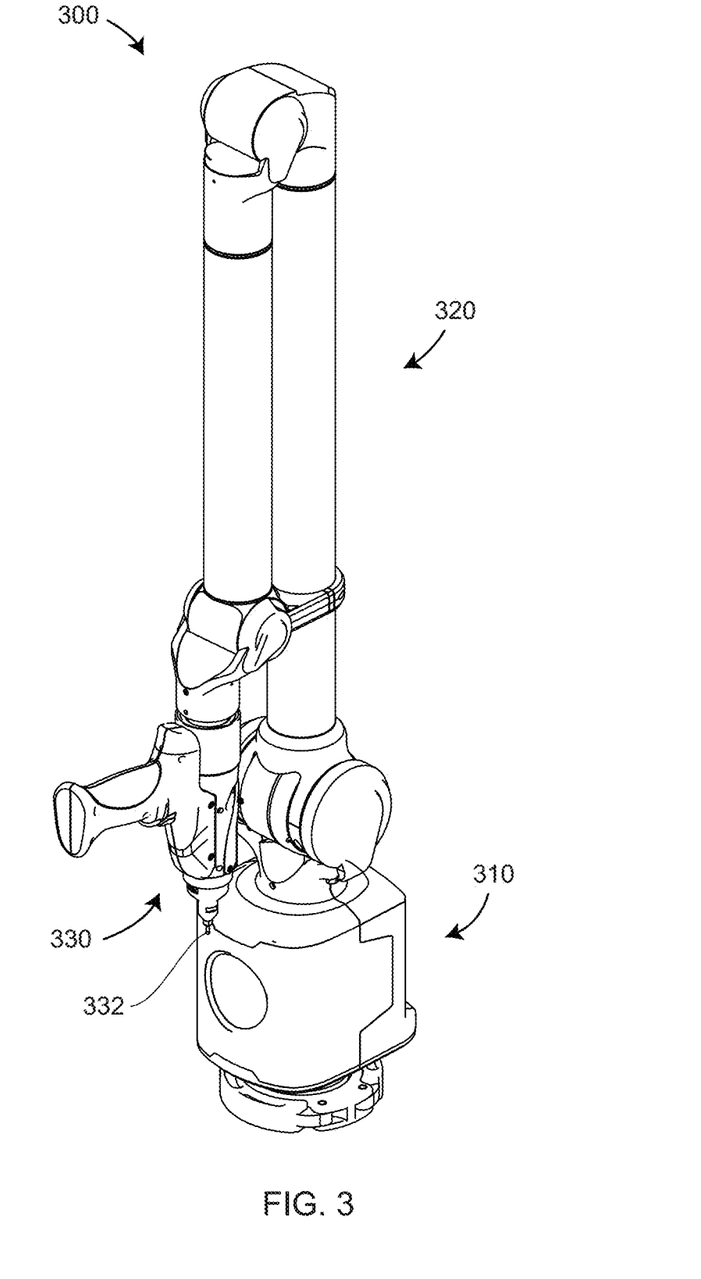
FIG. 3 is an isometric view of an articulated arm coordinate measuring machine (AACMM) according to an embodiment.
Figure 4:
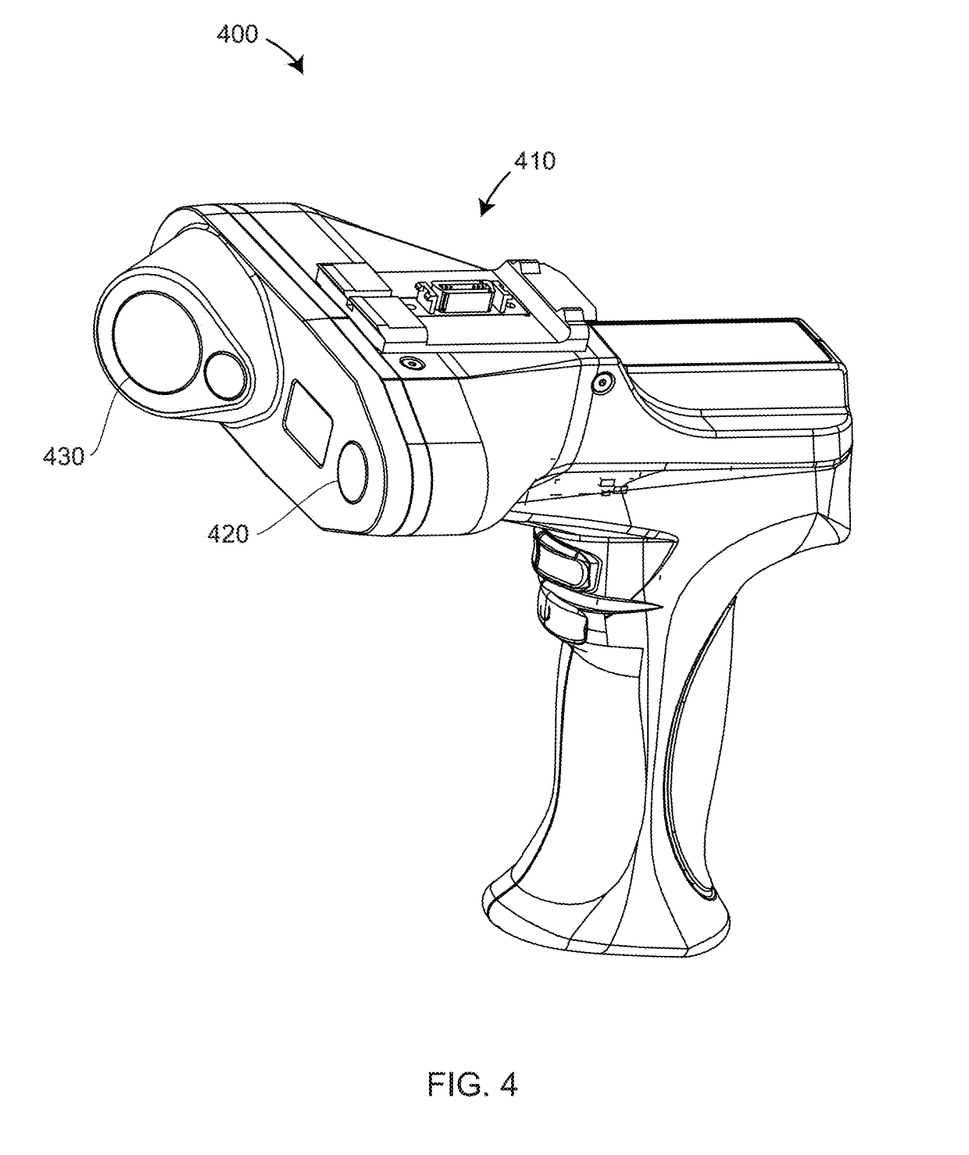
FIG. 4 is an isometric view of a laser line probe (LLP) according to an embodiment.

In an embodiment illustrated in FIG. 3, the 3D measuring instrument is an articulated arm coordinate measuring machine (AACMM) 300. In an embodiment, the AACMM 300 includes a base 310, a collection of articulated arm segments 320, and an end probe 330, which may be a tactile probe having a probe tip 332. In another embodiment, the tactile probe is replaced with a laser line probe (LLP) 400, also known as a line scanner, shown in FIG. 4. An LLP 400 is capable of quickly measuring a plurality of 3D points on the surface of an object-under-test. In an embodiment, the LLP 400 replaces or supplements the tactile end probe 330. In an embodiment, the LLP 400 is fixedly attached to the AACMM 300 by an electrical/mechanical attachment 410. In an embodiment, the LLP 400 includes a projector 420 that emits a line of light that intercepts an object under test. A camera 430 captures an image of the light projected onto the object. A processor within the AACMM 300 or operably coupled to the AACMM 300 determines 3D coordinates of points on the object-under-test. The 3D coordinates are determined using triangulation calculations, where the calculations are based at least in part on the image captured by the camera.

Figure 5:
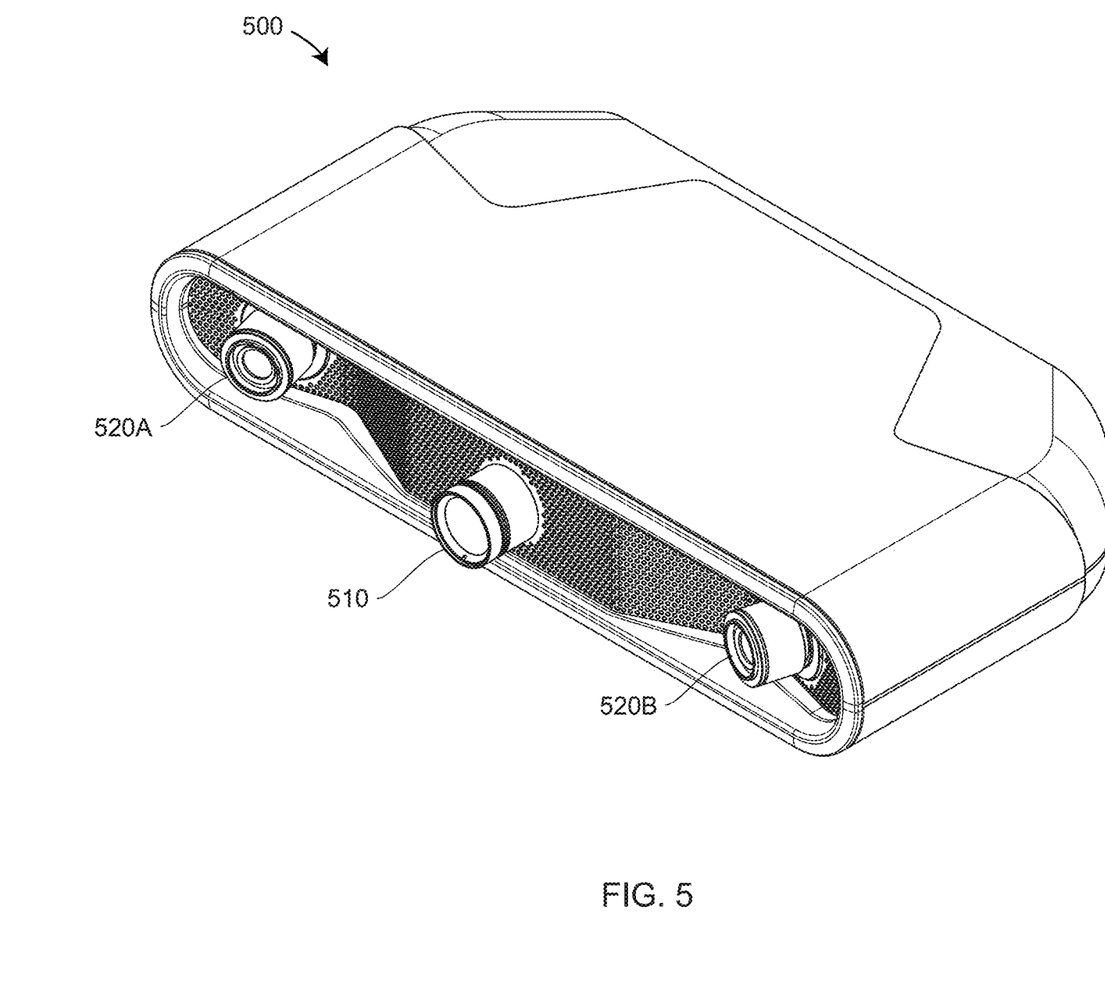
FIG. 5 is an isometric view of a triangulation scanner according to an embodiment.

In an embodiment illustrated in FIG. 5, the 3D measuring instrument 500 is a structured-light triangulation scanner having a projector 510, a first camera 520A, and a second camera 520B. In some embodiments, the triangulation scanner 500 has one camera rather than two cameras. In an embodiment, the triangulation scanner 500 emits a plurality of patterns while remaining stationary and then evaluates the collection of images obtained by the cameras 520A, 520B to determine the 3D coordinates. In an embodiment, the projected patterns are sinusoidal patterns that are shifted in phase and that also may have different spatial periods. A processor evaluates the captured images to determine the 3D coordinates of an object onto which the patterns were projected. In an another embodiment, the triangulation scanner 500 emits patterns having a pattern elements that may be matched to the patterns captured in images obtained by the cameras. For such a scanner, 3D coordinates are obtained in a single-shot mode, from a single projected and captured image. Such capture is often possible even when the scanner is moving. In most cases, structured light scanners that operate in a sequential mode (e.g. 3D coordinates are generated from multiple projected and captured images) are more accurate than scanners that operate in a one-shot mode.

Figure 6:
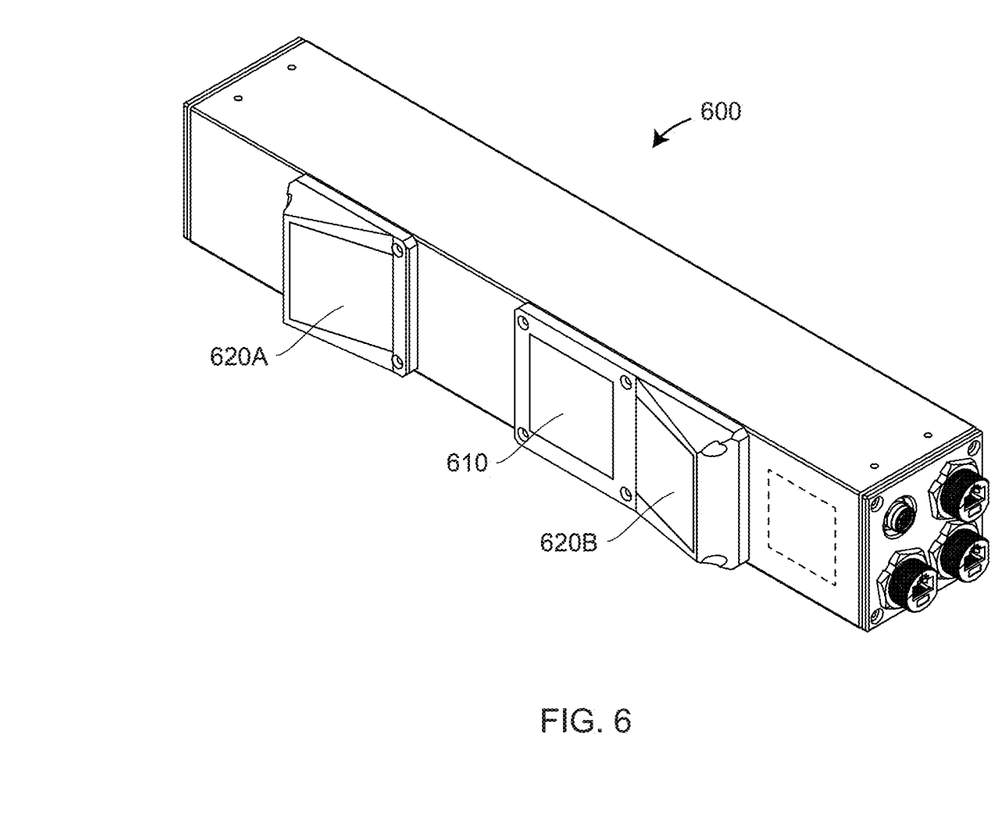
FIG. 6 is an isometric view of a triangulation scanner according to an embodiment.

In an embodiment illustrated in FIG. 6, a triangulation scanner 600 can measure 3D coordinates by projecting uncoded spots of light in a uncoded pattern. This type of triangulation scanner is described in commonly owned U.S. patent application Ser. No. 15/784,437 entitled "Triangulation Scanner having Flat Geometry and Projecting Uncoded Spots", the contents of which are incorporated by reference herein. In an embodiment, the scanner 600 projects the spots of light from a projector 610 onto an object-under-test. Images of the spots of light are captured by the cameras 620A, 620B. A processor within the triangulation scanner 600 or operably coupled to the triangulation scanner 600 determines 3D coordinates using triangulation.

Figure 7A:
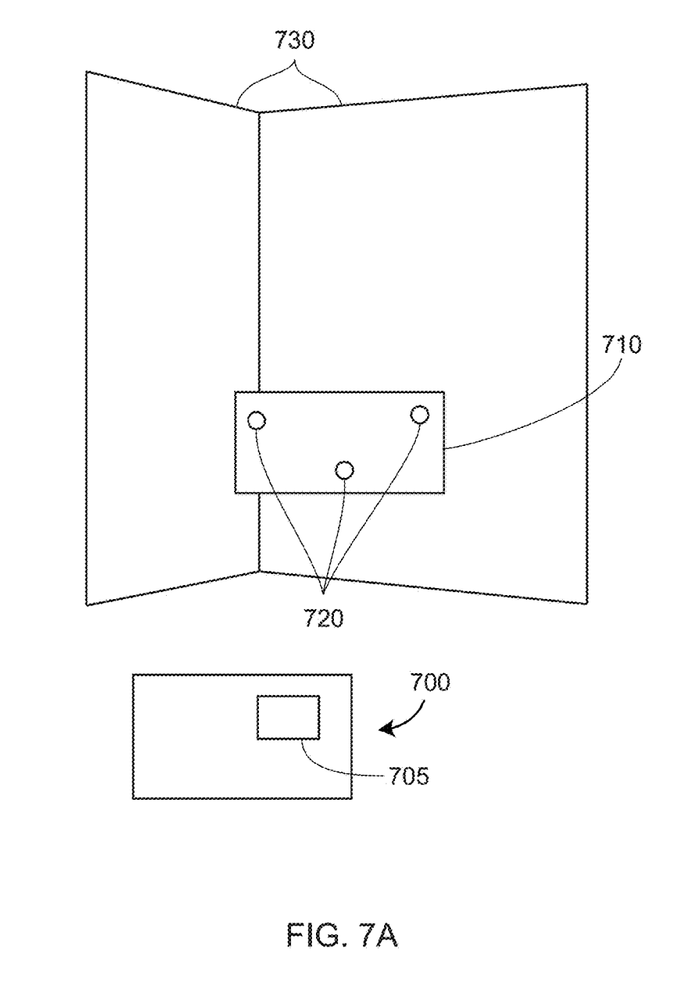
FIGS. 7A, 7B are schematic representations of a dimensional measuring instrument cooperating with a camera to register markers on or off an object according to an embodiment.
Figure 7B:
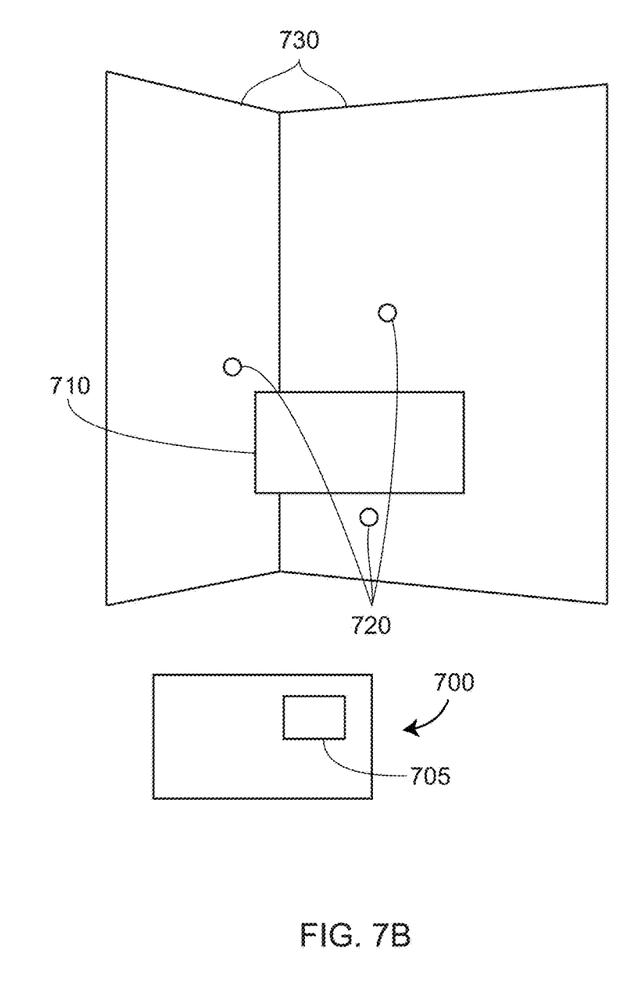

FIGS. 7A, 7B illustrate a situation in which a 3D dimensional measuring instrument 700 fixedly coupled to a camera 705 determines the 3D coordinates of an object 710. The 3D measuring instrument 700 and camera 705 may be mounted on a stand 105 or mobile cart 125 as in FIGS. 1A, 1B. In an embodiment, the dimensional measuring instrument 700 is moved to 2 or more different poses, making dimensional measurements in each instance. Afterwards, the results of the dimensional measurements from the 2 or more poses are registered together to determine 3D coordinates of the object. In FIG. 7A, markers 720 are located on the object 710. Such markers 720 may be reflective dots, LEDs, or natural features of the object. In FIG. 7B, markers 720 are located at least partly off the object 710. For example, such markers 720 may be located on walls 730 or on a test fixture that holds the object 710. By capturing the markers 720 with the camera 705 from each of the different poses of the dimensional measuring instrument 700, the dimensional measurements obtained in the different poses can be registered together, thereby enabling a 3D measurement of the object to be obtained over a relatively large volume.

The term "pose" of a measuring instrument, as used in the present document, refers to the six degrees-of-freedom (DOF) of the measuring instrument. Here the six DOF are three degrees of translational freedom (e.g., x, y, z) and three degrees of orientational freedom (e.g., roll angle, pitch angle, yaw angle).

Figure 8:
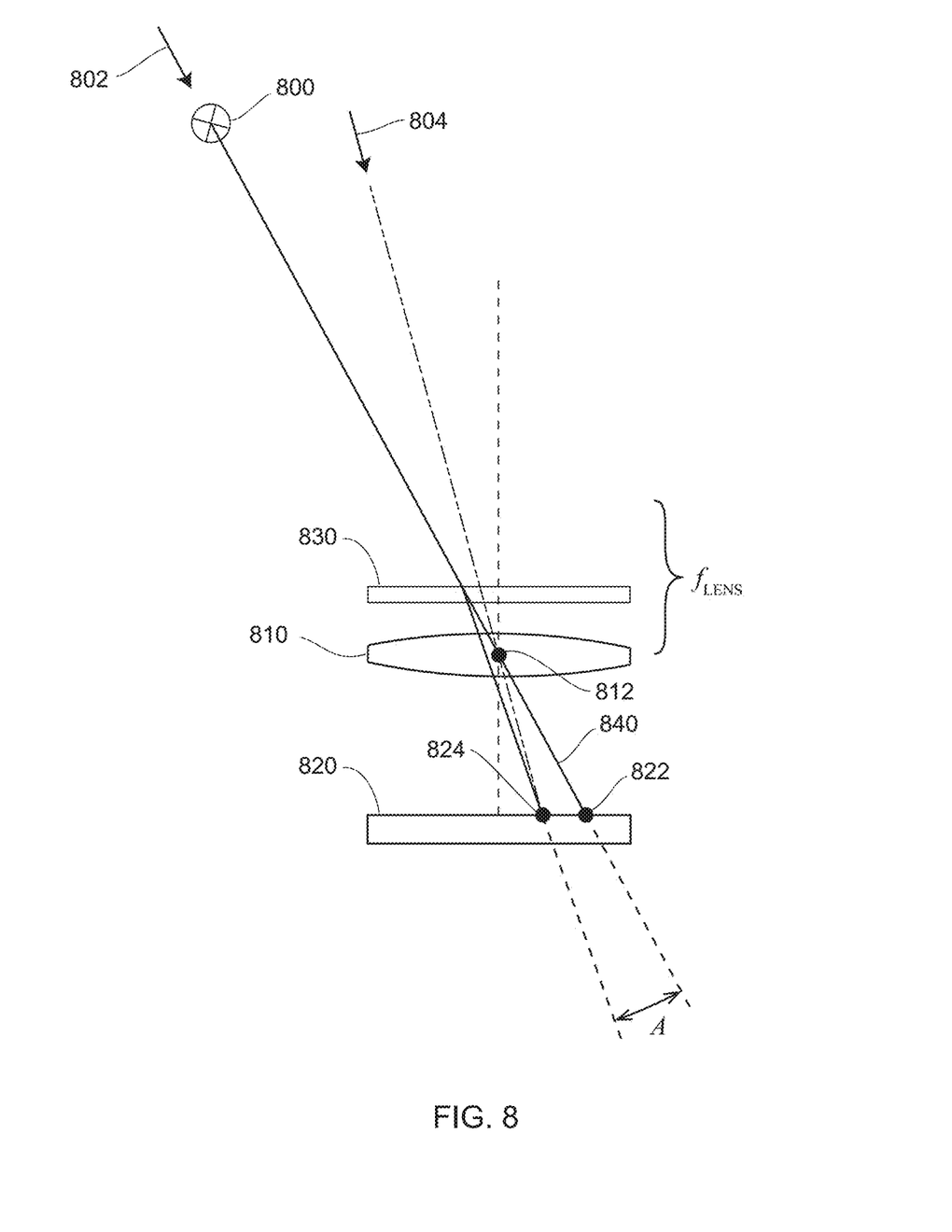
FIG. 8 is a schematic illustration of the effect of a diffractive optical element (DOE) in a camera according to an embodiment of the present invention.

FIG. 8 is a schematic representation of the effect of a diffractive optical element (DOE) 830 on an object point 800 imaged onto a photosensitive array 820 for one geometry of the DOE 830 and lens 810. In the absence of the DOE 830, the object point 800 is imaged by a lens 810 onto a photosensitive array 820. The focal length $f_{LENS}$ of the lens 810 is shown in FIG. 8. In the absence of the DOE 830, a ray of light 840 passes through the lens perspective center 812, creating an illuminated spot 822. With the DOE 830 in place, a displaced spot 824 may appear on the photosensitive array. The apparent direction of the diffracted ray of light is 804, while the real direction of the ray of light is 802. In an embodiment, characteristics of the DOE are used to calculate the real direction 802 of the ray of light based at least in part on the apparent direction 804 of the ray of light 840. In many cases, the original illuminated spot 822 will still appear on the photosensitive array even when the DOE 830 is in place. The spot 822 is referred to as the zeroth-order diffraction spot and the spot 824 is referred to as a higher-order diffraction spot (e.g., first-order spot, second-order spot, . . . ). The zeroth- and higher-order diffraction spots in FIG. 8 are separated by the angle A. In most cases, the zeroth-order diffraction spot will be brighter than the higher-order diffraction spots. The exact diffraction pattern projected onto the photosensitive array 820 depends on the pattern imprinted on the DOE 830.

Figure 9A:
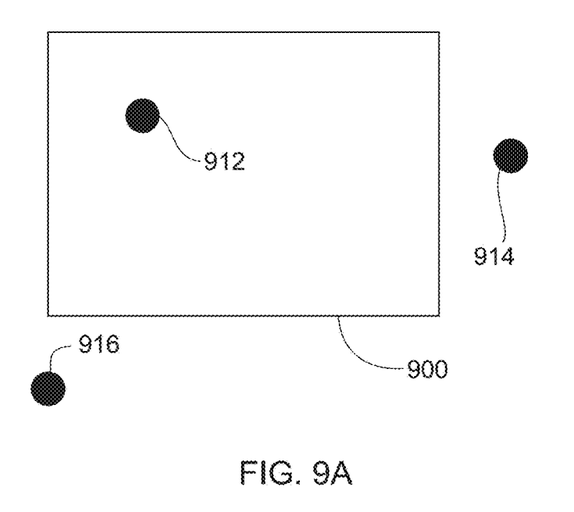
FIG. 9A is a representation of a spatial relationship among markers relative to an imaging region of an image sensor according to an embodiment.
Figure 9B:
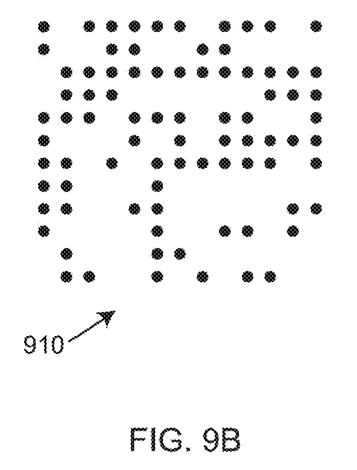
FIG. 9B is a representation of a pattern of higher-order diffraction components produced by a DOE according to an embodiment.
Figure 9C:
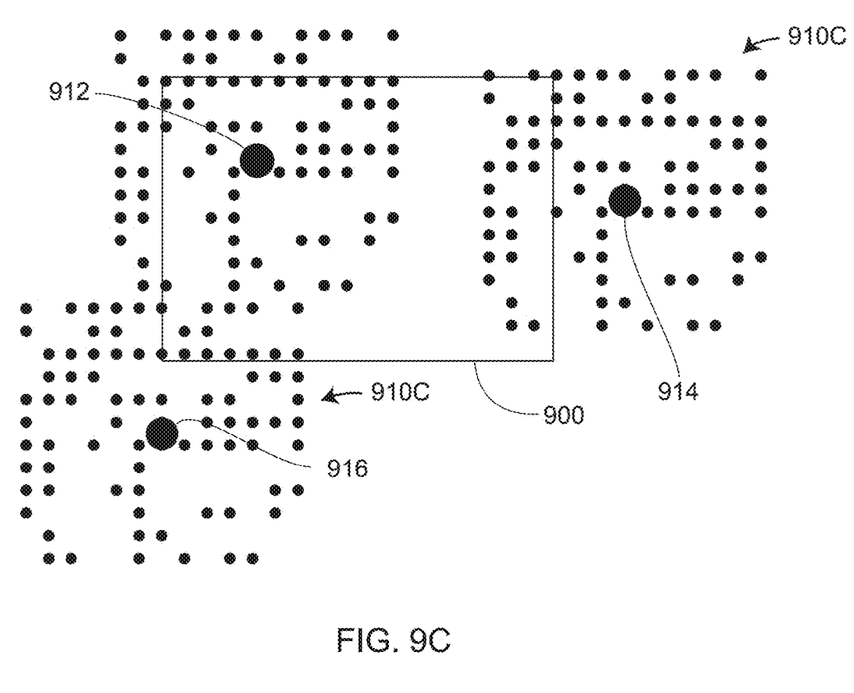
FIG. 9C is a representation of a spatial relationship among markers and higher-order diffraction components produced by a camera having a DOE, lens, and photosensitive array according to an embodiment.

FIGS. 9A, 9B, 9C illustrate a method of registering multiple 3D measurements obtained with a 3D measuring instrument in a plurality of different poses. Examples of the 3D measuring instruments 700 are 3D noncontact measuring instruments such as those illustrated in FIGS. 2, 3, 4, 5, and 6. The camera 705 (FIGS. 7A, 7B), which is fixedly coupled to the 3D measuring instrument 700, captures the markers 720 in FIGS. 7A, 7B from a plurality of different poses.

In FIGS. 9A, 9C, the rectangular region 900 represents the imaging area of the photosensitive array of the camera 705, with the marker 912 inside the imaging area 900 and other markers 914, 916 outside the imaging area 900. In an embodiment, a DOE is designed to produce a pattern of spots such as the exemplary pattern 910 of FIG. 9B. When the DOE is placed in front of the lens of the camera 705, the pattern 910 is replicated for each of the markers 912, 914, 916. The result, as shown in FIG. 9C, is a projection of portions of the diffraction pattern onto the imaging area 900 even for markers outside the imaging area. For example, a portion of the diffraction pattern 910 is projected to the left of the marker 914. Another portion of the diffraction pattern is projected upward from the marker 916. In some cases, there is an overlapping of diffraction patterns (for example, for the spots 912 and 916), while in other cases, there is no overlapping (for example, for the spots 912 and 914). By evaluating the collection of diffraction spots on the imaging array, a processor may determine the position of some diffraction spots that would otherwise not be visible, thereby increasing the effective field-of-view of the camera 705 without sacrificing the resolution and linearity of the camera system, as would be the case were a wider FOV lens to be used. In FIG. 9C, the imaged markers 912, 914, 916 are much stronger than the spots in the surrounding diffraction patterns. This is the result of the zeroth-order diffraction spot being relatively strong compared to the higher-order diffraction spots.

Figure 10A:
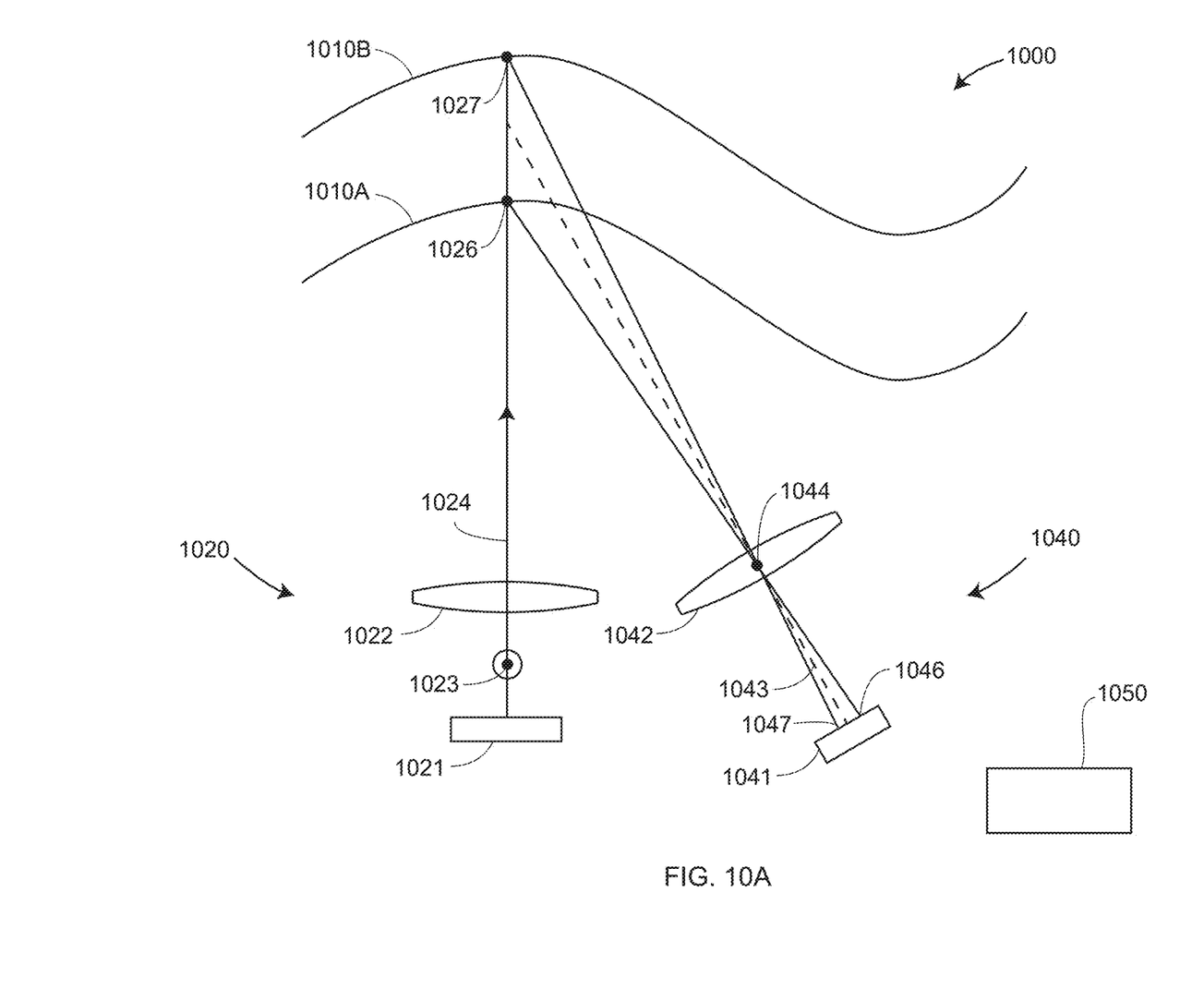
FIG. 10A is a schematic illustration of the principles of operation of a line scanner according to an embodiment.

In various embodiments, an LLP (line scanner) 400 is attached to a robot, an AACMM 300, a stand 105 as a 3D measuring instrument 115, or a mobile cart 125 as the 3D measuring instrument 135. FIG. 10A schematically illustrates elements of a representative LLP 1000, including a projector 1020 and a camera 1040. The projector 1020 includes a source pattern of light 1021 and a projector lens 1022. The projector lens 1022 includes a projector perspective center and a projector optical axis that passes through the projector perspective center. In the exemplary system of FIG. 10A, a central ray 1024 of the beam of light coincides with the projector optical axis. The camera 1040 includes a camera lens 1042 and a photosensitive array 1041. The lens 1042 has a camera optical axis 1043 that passes through a camera lens perspective center 1044. In the exemplary system 1000, the camera lens optical axis 1043 and the projector optical axis, which is aligned to the central ray 1024, are perpendicular to a plane that encompasses the line of light 1023 projected by the source pattern of light 1021. In other words, the plane that encompasses all the lines of light 1023 is in a direction perpendicular to the plane of the paper of FIG. 10A. The line of light 1023 strikes an object surface, which at a first distance from the projector is object surface 1010A and at a second distance from the projector is object surface 1010B. The line of light 1023 intersects the surface 1010A at a point 1026 (in the plane of the paper), and it intersects the surface 1010B at a point 1027 (in the plane of the paper). For the case of the intersection point 1026, a ray of light travels from the point 1026 through the camera lens perspective center 1044 to intersect the photosensitive array 1041 at an image point 1046. For the case of the intersection point 1027, a ray of light travels from the point 1027 through the camera lens perspective center 1044 to intersect the photosensitive array 1041 at an image point 1047. By noting the position of the intersection point relative to the position of the camera lens optical axis 1043, a processor 1050 coupled to the LLP 1000 determines the distance from the camera (and projector) to the object surface using the principles of triangulation, which typically rely on the "baseline" distance between the perspective centers of the projector 1020 and the camera 1040. The processor 1050 likewise finds the distance from the projector to other points projected by the line of light 1023 onto the object based on the principles of triangulation. In other words, the processor 1050 finds points on the line of light that do not lie in the plane of the paper of FIG. 10A.

Notice that in FIG. 10A the nearer object point 1026 is projected more to the right of the photosensitive array 1041 as the image point 1046, while the farther object point 1027 is projected more to the left of the photosensitive array 1041 as the image point 1047. Note in FIG. 10A that movements to the left and right on the photosensitive array 1041, as seen from the top view of FIG. 10A, correspond to object distances from far to near, respectively. Also notice that projected light striking the object at points above the plane of the paper of FIG. 10A will pass through the perspective center 1044, arriving below the plane of the paper of FIG. 10A. In contrast, projected light striking the object at points below the plane of the paper of FIG. 10A will pass through the perspective center 1044, arriving above the plane of the paper of FIG. 10A. Hence, as seen from the top view of FIG. 10A, image points further to the right on the photosensitive array 1041 correspond to nearer object points, while image points higher on the photosensitive array 1041 correspond to lower object points (where lower object points are further beneath the paper).

Figure 10B:
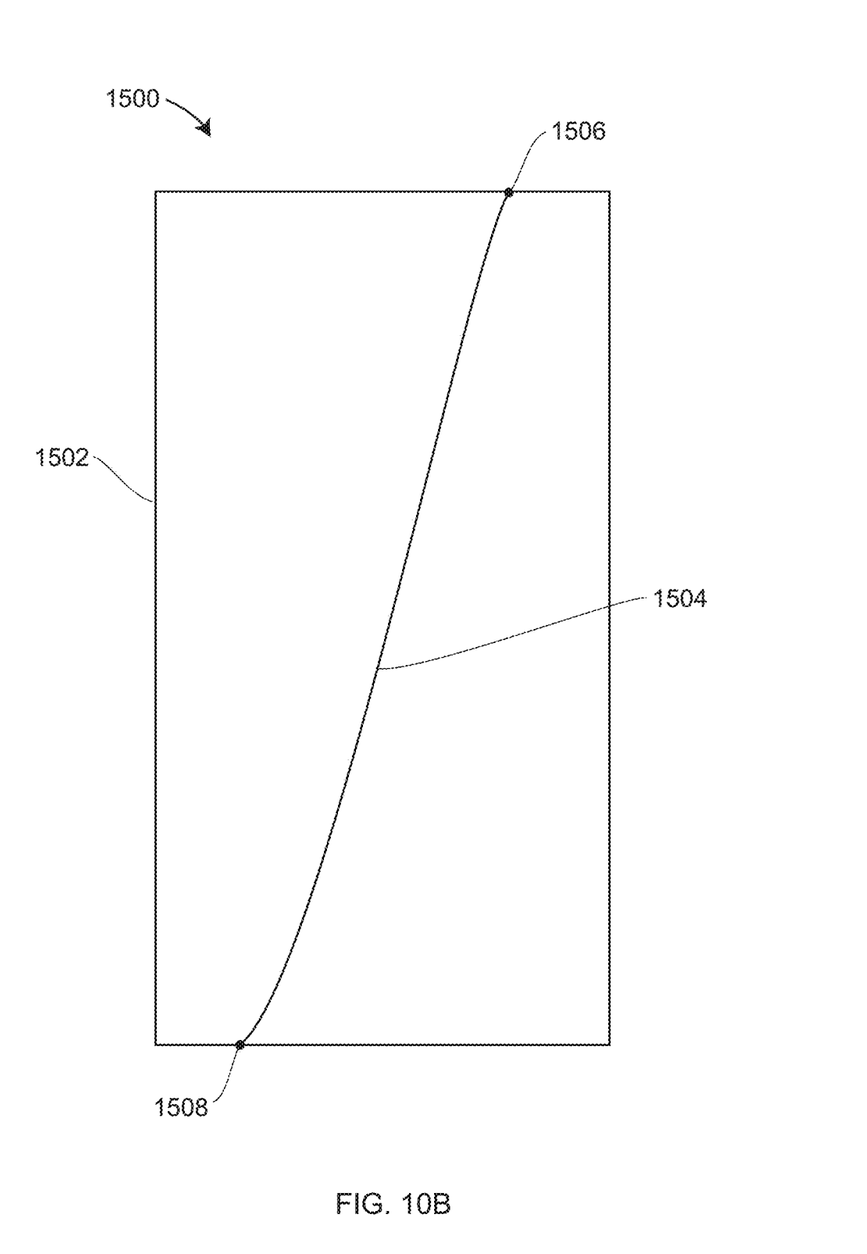
FIGS. 10B, 10C are two possible image patterns captured by a line scanner having a camera without a DOE according to an embodiment.

FIG. 10B is a schematic representation 1500 of an image captured by the photosensitive array 1041 when viewed toward the front surface of the photosensitive array. The photosensitive array area 1500, and the outline of the array area is 1502. A line of light 1023 is projected onto the object and its scattering is imaged by the lens 1044 to form the imaged line 1504. When seen from the top view of FIG. 10A, an image point further to the left on the photosensitive array 1041 corresponds to more distant object points, but when seen from the view looking toward the front surface of the photosensitive array, the left and right directions are reversed so that an image point further to the left corresponds to a nearer object point. Hence the point 1506 is further to the right than the point 1508, which indicates that the point 1506 is more distant from the projector 1020 than the point 1508. Also, since the point 1506 is higher on the photosensitive array, it is lower on the object than the point 1508.

Figure 10C:
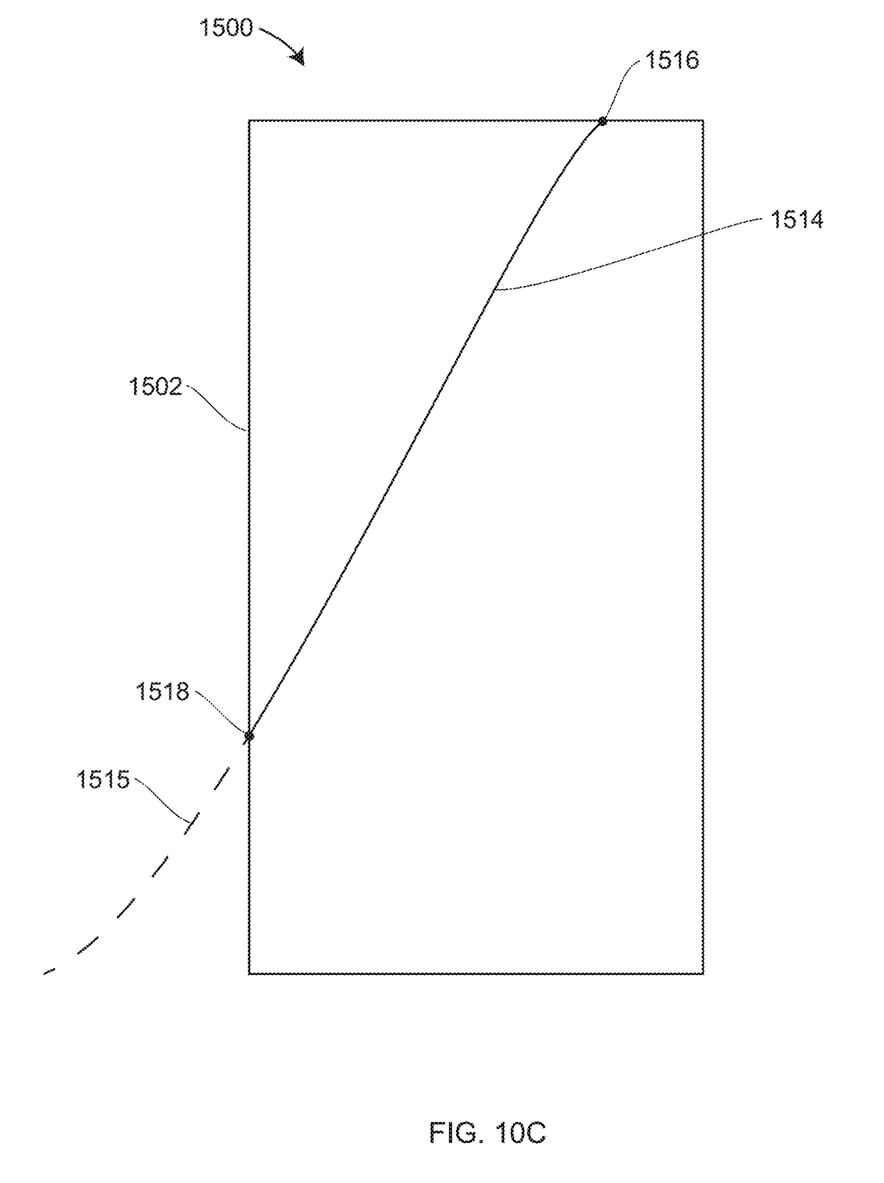

FIG. 10C is a schematic representation of an imaged line 1514 captured within the array area 1502 when a portion of the object is closer than the nearest point that can be captured by the photosensitive array 1041 without going off the edge of the array. That portion of the scattered line of light not captured by the photosensitive array is the dashed line 1515. The nearest point that can be measured by the LLP 1000 in FIG. 10A is the point 1518 in FIG. 10C.

Figure 11A:
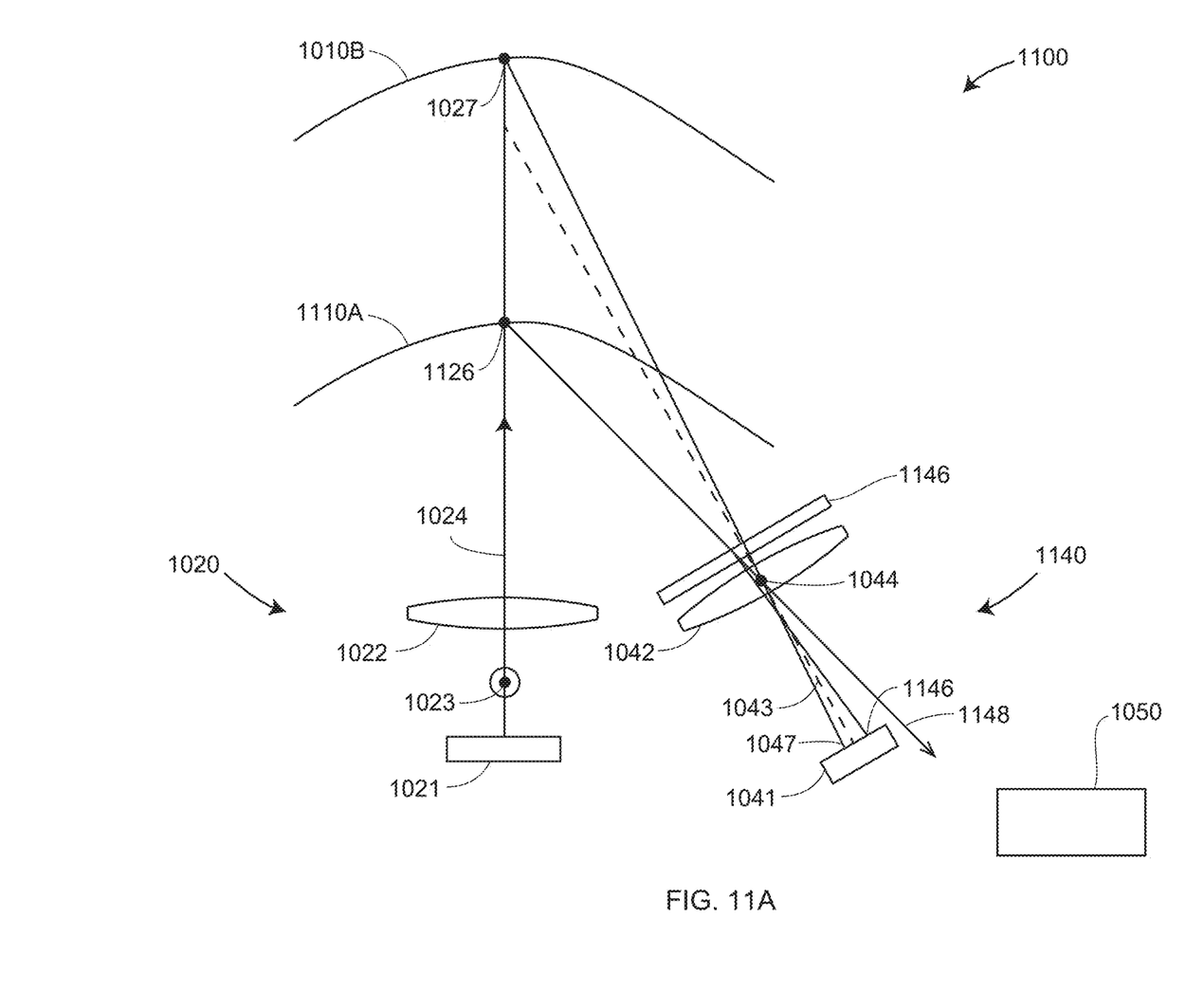
FIG. 11A is a schematic illustration of a line scanner having a camera that includes a DOE according to an embodiment.

FIG. 11A schematically illustrates elements of a representative LLP 1100, which is like the LLP 1000 of FIG. 10A except that the camera 1140 of FIG. 11A further includes a DOE 1146. In FIG. 11A, a near point 1126 from the near object at position 1110A sends a ray of light through the perspective center 1044, causing the beam of light 1148 to miss the photosensitive array 1041 altogether. However, the light also passes through the DOE 1146, which sends a higher order spot to the point 1146 on the photosensitive array 1041.

Figure 11B:
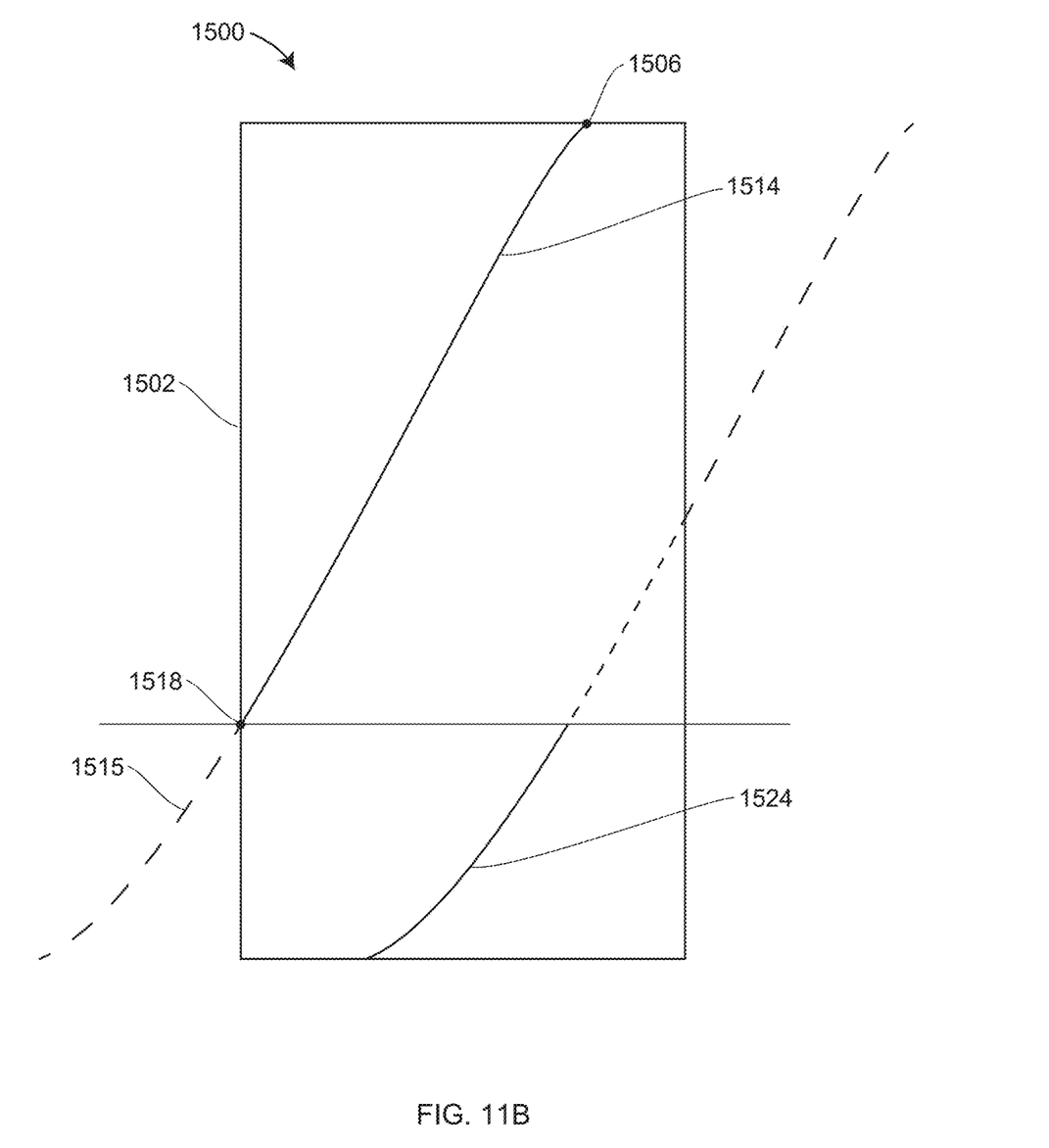
FIG. 11B is an exemplary image pattern obtained by a line scanner having a camera that includes a DOE according to an embodiment.

FIG. 11B illustrates a pattern that might be captured by the photosensitive array 1041 of the LLP 1100. In that region for which the zeroth order beam is to the left of the array area outline 1502, $1^{st}$ order diffraction by the DOE 1146 produces the line 1524. By knowing the characteristics of the DOE 1146, the distances corresponding to the imaged line 1524 may be determined, thereby enabling the LLP 1100 to measure points closer than would be possible with the LLP 1000.

In an embodiment, the positions of markers on an image of the photosensitive array 1041 may be used by a processor to determine six degrees-of-freedom of the projected markers or of the camera 1140 within a frame of reference. The frame of reference may be selected as desired—for example, an initial frame of the camera 1140 or an initial frame of reference of an object 1110A/1110B within a workspace or the tool center frame of reference or a manipulator like a robot.

Terms such as processor, controller, computer, DSP, FPGA are understood in this document to mean computing devices that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not limited by the foregoing description, but only as limited by the scope of the appended claims.

What is claimed is:

1. A method comprising:
providing a three-dimensional (3D) measuring instrument and a registration camera coupled to the 3D measuring instrument, the registration camera having a diffractive optical element (DOE), and a photosensitive array;
with the 3D measuring instrument, determining 3D coordinates of an object at each of a plurality of poses of the 3D measuring instrument;
with the camera, capturing for each of the plurality of poses an image having a diffraction component of one or more markers on or around the object;
with the processor, registering the determined 3D coordinates based at least in part on the determined 3D coordinates and on the imaged diffraction components of the one or more markers; and
storing the registered 3D coordinates.

2. The method of claim 1 wherein the camera is integrated into the 3D measuring instrument.

3. The method of claim 1 wherein the 3D measuring instrument is mounted on one of a stand and a mobile cart.

4. The method of claim 1 wherein the 3D measuring instrument is selected from the group consisting of: a laser tracker, an articulated arm coordinate measuring machine (AACMM), a line scanner, a structured-light scanner, and a triangulation scanner that projects uncoded spots in an uncoded pattern.

5. The method of claim 1 wherein at least some of the markers are located on the object.

6. The method of claim 1 wherein the markers are selected from the group consisting of: reflective markers, retroreflective markers, light-emitting diodes (LEDs), and laser-projected marks.

7. The method of claim 1 wherein the DOE produces a multiplicity of higher-order diffraction components for each zeroth-order diffraction component.

* * * * *